2 Sheets—Sheet 1.

W. J. METTLER.
HAY RAKER AND COCKER.

No. 177,737. Patented May 23, 1876.

Witnesses.
A. Ruppert.

W. J. Mettler
Inventor.
D. S. Holloway & Co.
Attys.

2 Sheets—Sheet 2.

W. J. METTLER.
HAY RAKER AND COCKER.

No. 177,737. Patented May 23, 1876.

Witnesses.
A. Ruppert.

Inventor:
W. J. Mettler
D. P. Holloway & Co.
Attys

UNITED STATES PATENT OFFICE.

WILLIAM J. METTLER, OF MENDOTA, ILLINOIS.

IMPROVEMENT IN HAY RAKERS AND COCKERS.

Specification forming part of Letters Patent No. 177,737, dated May 23, 1876; application filed September 25, 1875.

*To all whom it may concern:*

Figure 1:
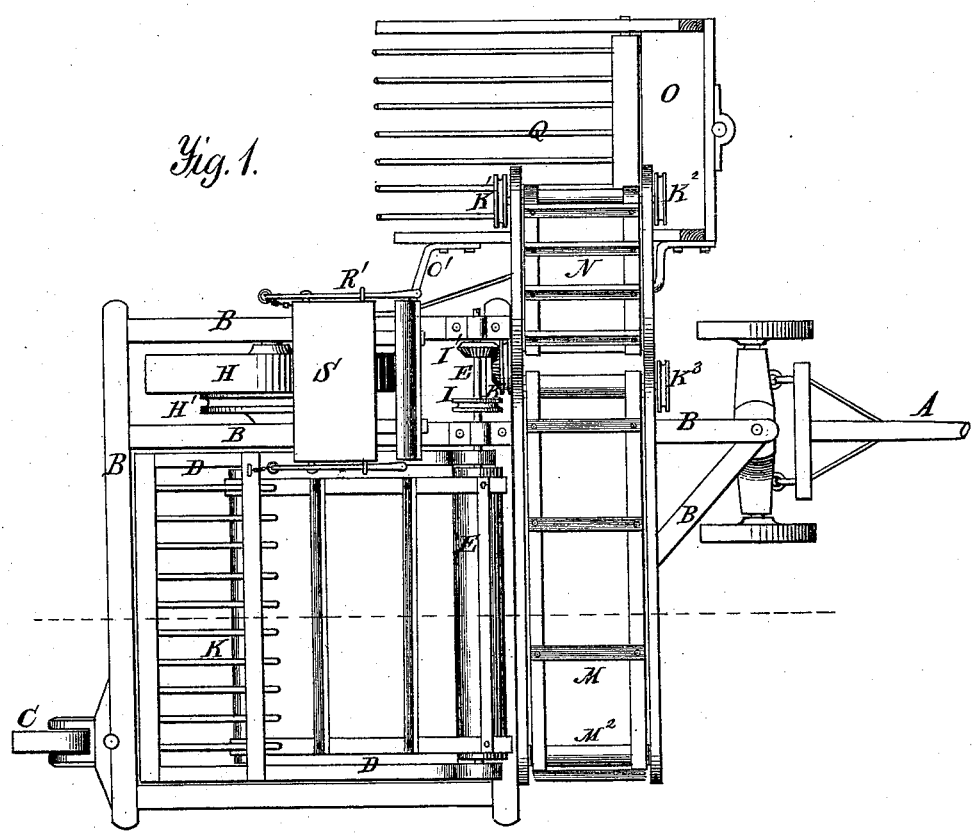
Figure 2:
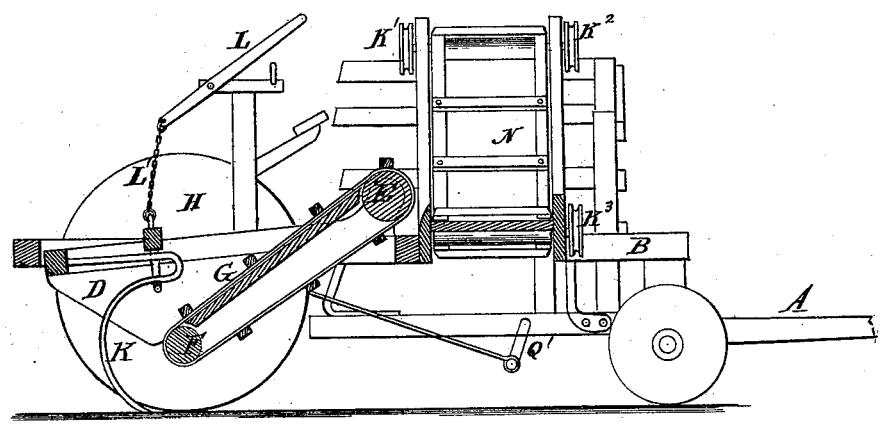
Figure 3:
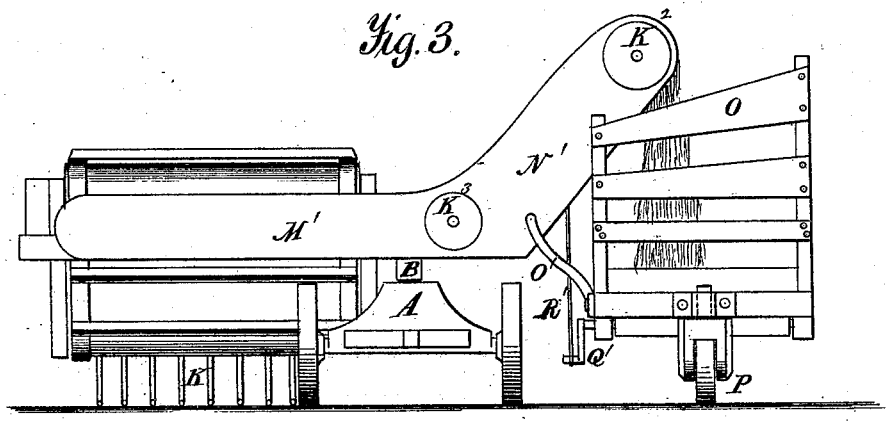
Figure 4:
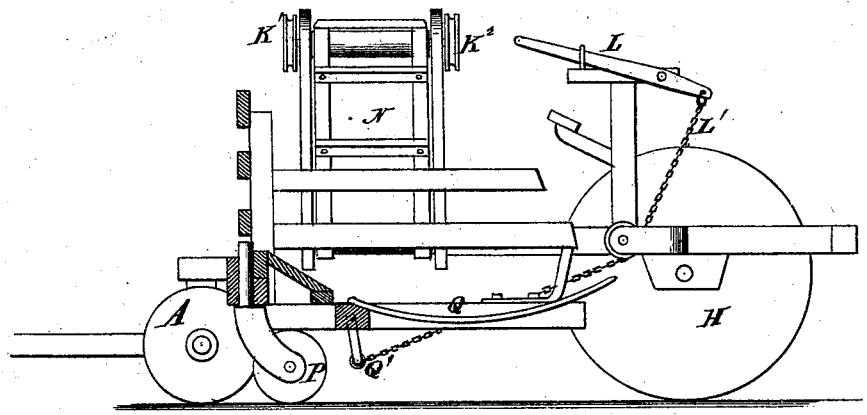

Be it known that I, WILLIAM J. METTLER, of Mendota, in the county of La Salle, and State of Illinois, have invented a new and useful Improvement in Machines for Cocking Hay, of which the following is a specification:

In the annexed drawings, making part of this specification, Figure 1 is a plan view of the machine. Fig. 2 is a longitudinal vertical section. Fig. 3 is a front elevation. Fig. 4 is a sectional side elevation.

The same letters are employed in all the figures in the indication of identical parts.

The draft is applied to the forward truck attached by a king-bolt to the front end of the main frame B. The caster-wheel C at one corner, and the driving-wheel H on the other side, support the frame at the rear. This frame carries an auxiliary frame, D, which is hinged to the main frame by a rod which forms the shaft of the roller E, and a parallel roller, F, has its bearings in the lower end of frame D. An endless apron, G, with cleats across its face, is carried around the two rollers. On the side of the driving-wheel H is a pulley, H', the belt of which passes around and communicates rotation to the pulley I on the shaft E', causing the endless apron G to revolve, so as to carry up the cut hay which is gathered from the ground by the wire-teeth K, which are fastened to the rear of the auxiliary frame D, as clearly shown in Fig. 2. The height of the points of the teeth is regulated by means of the lever L and chain L' attached to the frame D. The hay gathered in front of and raised upon the teeth K will be caught by the endless apron and raised upon the transverse apron M, and by it carried to the apron N, by which it will be elevated and thrown into the carrier O. The aprons M and N revolve upon rollers placed across the trunk M¹ N', and receive their motion in the following manner: The bevel-wheel I, on the end of the shaft E', drives another, K, upon the side of the trunk. A pulley on the back of this wheel communicates motion to a pulley, K¹, on the end of the shaft of the upper roller of apron N. The pulley K² on the other end of this shaft is connected by a belt with the pulley K³ on the outer end of the driving-roller of apron M. The other end of this apron is on the independent roller M².

The carrier O is connected to the main frame and trunk by rods O', which permit it to accommodate its motion to irregularities of the surface. The front end rests on the caster-wheel P. When the hay is thrown into the carrier it rests upon the oscillating teeth Q, which are turned up so as to support it, being sustained by the crank-arm Q', which is connected with the lever R by the chain R'. When a sufficient amount of hay has been gathered to form a cock, the end of the lever being raised the points of the teeth will be dropped so that the hay on the teeth will rest on the stubble, when the teeth will be drawn from under and the hay be left standing in a cock. The teeth are bent longitudinally, so that the hay in the carrier will be lowest in the center, and when transferred to the ground will settle most on the sides, thereby giving a downward inclination to the hay on the outside of the cock to shed the rain. S is the driver's seat, having the levers L and R on each side.

What I claim as my invention, and desire to secure by Letters Patent, is—

1. The combination, with the rake for gathering the hay, and elevators G, M, and N, for carrying it up and discharging it on one side of the machine, of the carrier O, constructed with the falling bottom Q, by which when enough hay has been gathered to form a cock it may be deposited on the ground, substantially as set forth.

2. In combination with the hinged carrier bottom Q and driver's seat, the lever and chain for dropping the cock, substantially as set forth.

3. In combination with the main frame supporting the gathering and elevating mechanism, the carrier and dropper connected thereto by rods, allowing a vertical oscillation and a flexible connection between the lever and dropper, substantially as set forth.

In testimony whereof I have signed my name to this specification in the presence of two subscribing witnesses.

WILLIAM J. METTLER.

Witnesses:
REUBEN A. PRESCOTT,
JOSEPH HUNTER.